C. B. KIRKHAM.
AERONAUTICAL MOTOR.
APPLICATION FILED MAY 18, 1916.

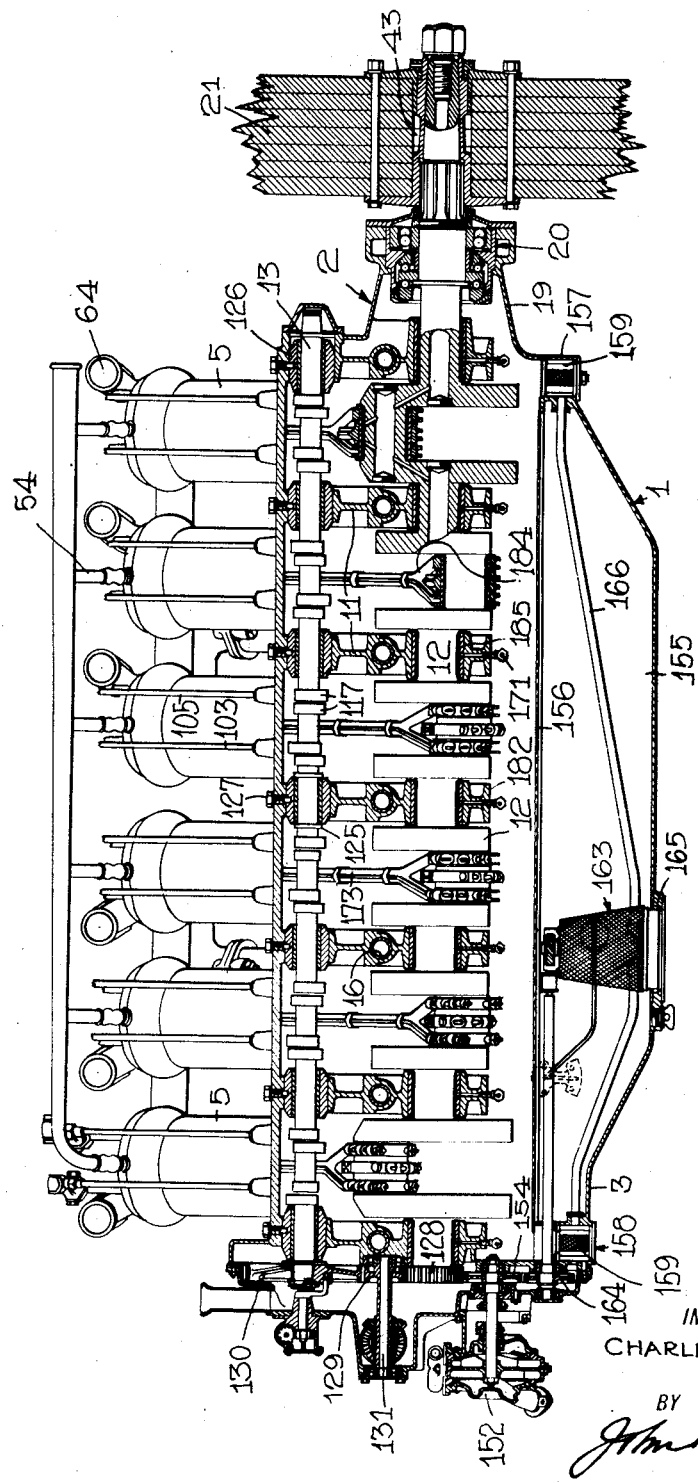

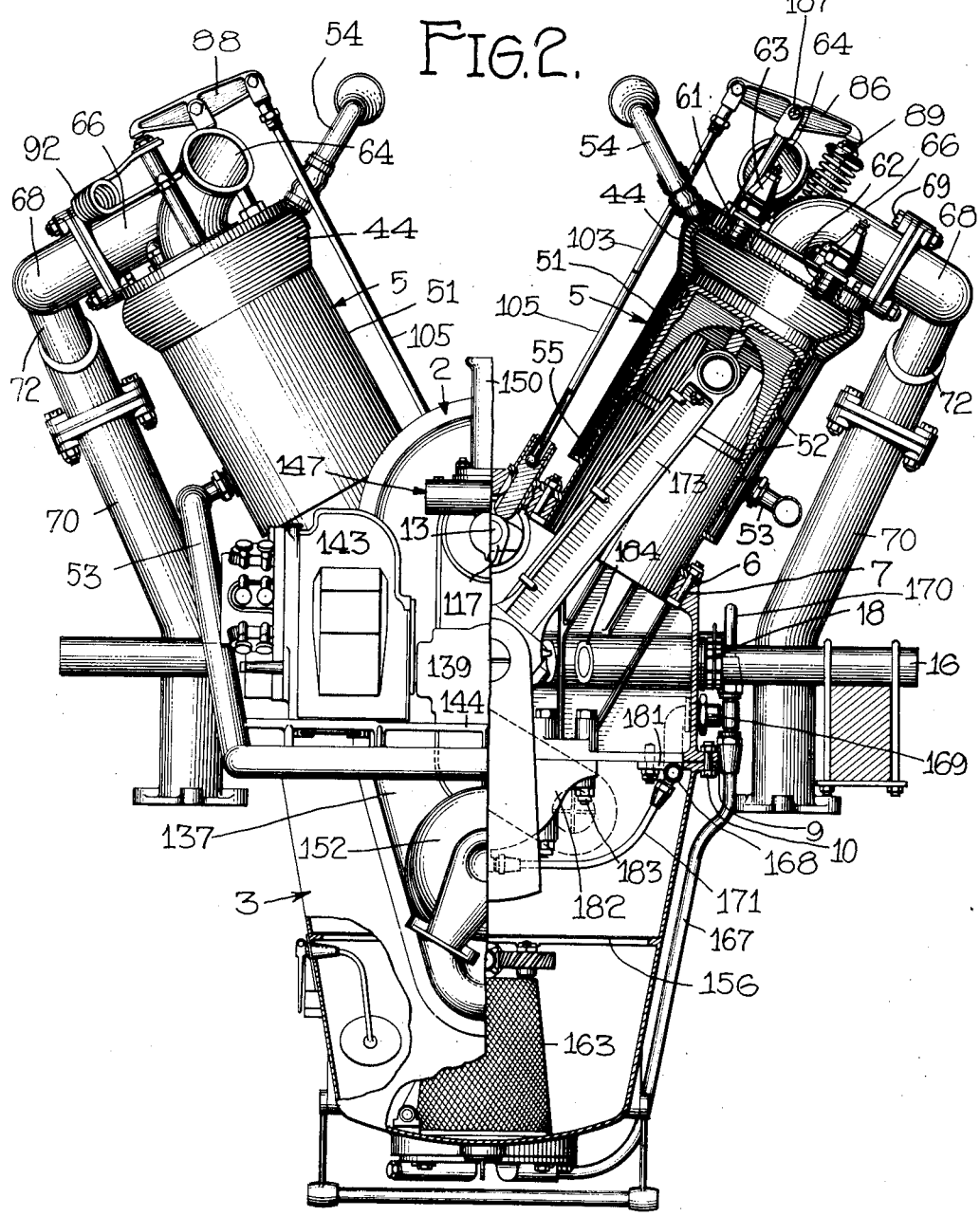

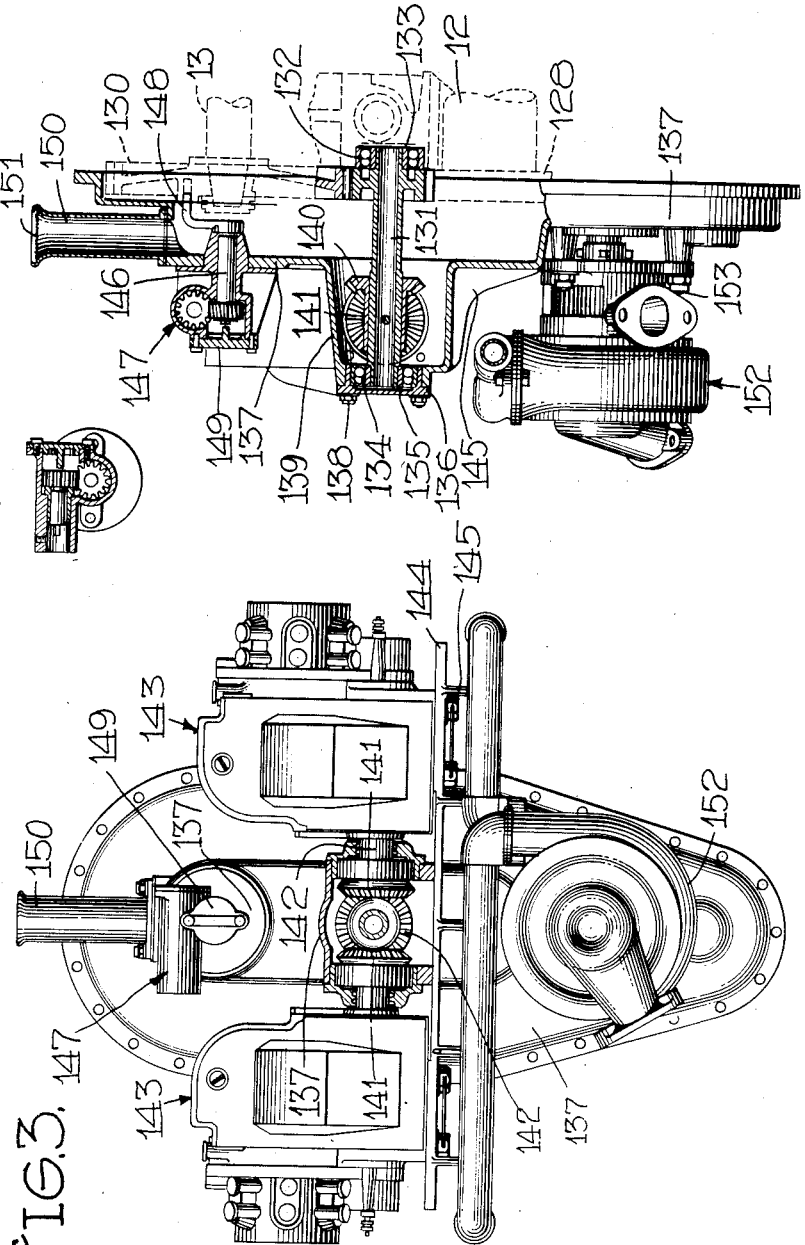

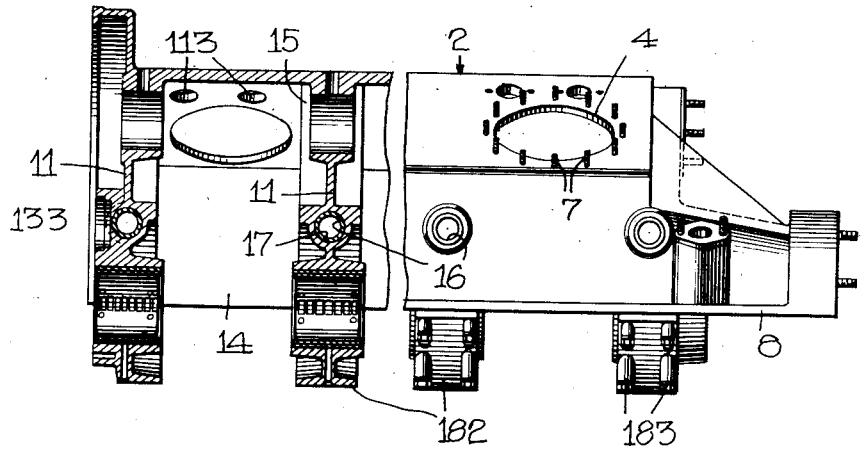
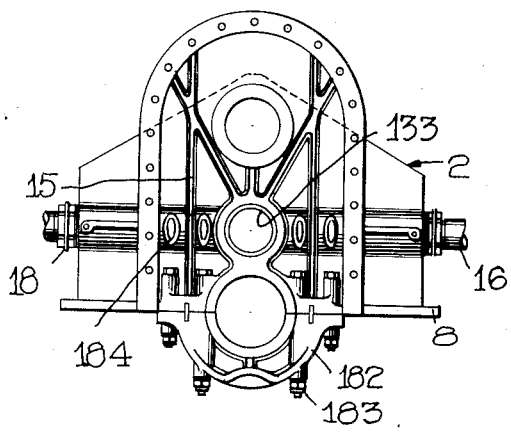
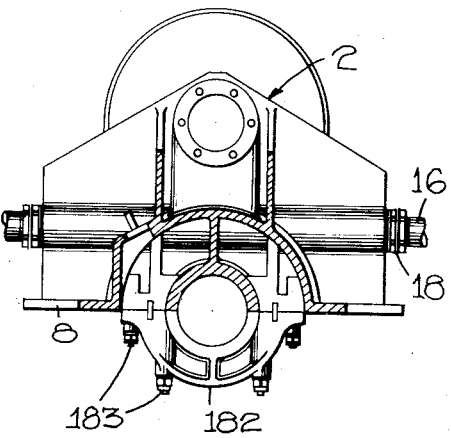

1,351,763.

Patented Sept. 7, 1920.
5 SHEETS—SHEET 5.

Inventor
CHARLES B. KIRKHAM

By John P. Larbox

Attorney

UNITED STATES PATENT OFFICE.

CHARLES B. KIRKHAM, OF BUFFALO, NEW YORK, ASSIGNOR TO CURTISS AEROPLANE AND MOTOR CORPORATION, A CORPORATION OF NEW YORK.

AERONAUTICAL MOTOR.

1,351,763.　　　　　　Specification of Letters Patent.　　Patented Sept. 7, 1920.

Application filed May 18, 1916.　Serial No. 98,336.

*To all whom it may concern:*

Be it known that I, CHARLES B. KIRKHAM, a citizen of the United States, residing at Buffalo, in the county of Erie and State of New York, have invented certain new and useful Improvements in Aeronautical Motors, of which the following is a specification.

This invention relates to motors and particularly to internal combustion engines for driving aircraft.

The object of the invention is an improved motor possessing to a marked degree certain of those features desirable in an aeronautical motor, namely, reliability and dependability in operation at all times and great endurance under the severe conditions to which an aeroplane motor is subjected. To this end I have devised a motor embodying the improvements hereinafter set forth.

I have illustrated my improvements as embodied in a V-type motor in which the cylinders, preferably twelve in number, are arranged in banks and radially with respect to the crank case in series of six each. By multiplying the number of cylinders, the vibration incident to operation is cut to a minimum. Partitions subdivide the crank case into a plurality of intercommunicating compartments and transversely brace the engine from end to end. Each partition serves as a bearing for the crank shaft of the engine, and as a means whereby the supports for the engine may be secured against both lateral and longitudinal displacement. The elements functioning to control the intake and the exhaust are symmetrically arranged in so far as practicable at opposite sides of the engine to secure an equal distribution of weight on opposite sides of the longitudinal axis of the aircraft in connection with which the engine is used. The cam shaft, like the crank shaft, is hollow throughout and of a construction affording with said crank shaft and with various other devices, a practical and highly efficient force-feed lubricating system reaching each and every part of the engine or motor requiring lubrication. Bodily removable strainers are interpolated in the lubricating system to catch and to destrain any and all foreign substances that might be contained in the lubricating medium. The strainers being bodily removable, either or both may be quickly removed, cleaned and replaced. The construction of the cam shaft and the symmetrical arrangement of the cams thereon is such as to provide for a reversal of the operation of the engine by simply removing the cam shaft, reversing its position without readjustment of the cams, and replacing the shaft as before. For convenience in assembling and to secure compactness, the magneto or magnetos, the tachometer, and water circulating pump or pumps are mounted exteriorly of the crank case and at one end thereof for operative association with the crank shaft. Each of the several devices is removable separately or removable as a unit by removal of the end crank case cover. Other various and improved essentials and details will be more specifically set forth hereinafter.

While the embodiment of my invention herein illustrated is that best known to me I desire to emphasize the fact that certain changes and variations in construction may be resorted to in the practice of the invention at a future date without departing from the spirit thereof as hereinafter claimed.

Figure 1 is a longitudinal sectional view of my improved aeronautical motor;

Fig. 2 is a detail end view, partly in transverse section;

Fig. 3 is a detail end elevation of the crank case cover, partly in section;

Fig. 4 is a transverse longitudinal sectional view of the end crank case cover;

Fig. 5 is a detail transverse sectional view of the tachometer;

Fig. 6 is an elevation, partly in section, of the upper crank case section;

Fig. 7 is a front end view of the upper crank case section;

Fig. 8 is a rear end view of the upper crank case section;

Figure 9:
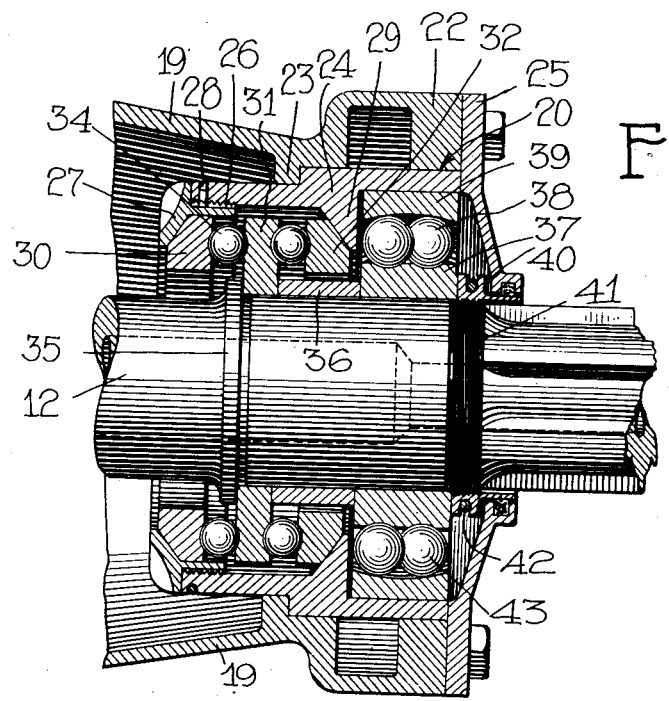
Fig. 9 is a longitudinal sectional view of the combined radial and axial thrust bearing for the crank shaft.
Figure 10:
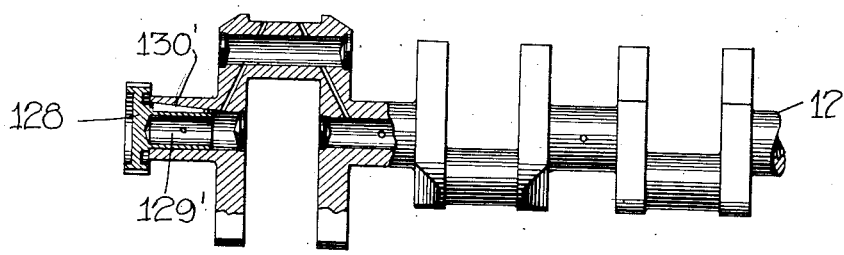
Fig. 10 is a detail elevation, partly in section, of the crank shaft.
Figure 11:
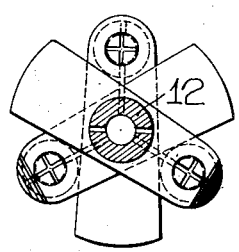
Fig. 11 is a cross sectional view of the crank shaft.

The crank case of my improved multicylinder internal combustion engine, designated as an entirety by the numeral 1, is preferably made up of separably connected crank-case-sections denoted respectively 2 and 3. Openings 4 (twelve in number) are formed in the upper crank-case-section 2 with an equal number (six) at each side of the longitudinal axis of the engine. Cylinders 5, likewise twelve in number, are mounted to engage at one end in each of the respective openings 4 of the crank case to thus equally and symmetrically distribute the weight of the engine at opposite sides of its longitudinal axis. A securing flange 6 is formed as an integral part of each cylinder 5 to rest upon the top outside surface of the crank case section 2, the mentioned flange, with bolts 7 mounted to pass therethrough and through the wall of the crank case section 2, affording a securing means for the several cylinders. As illustrated to advantage in Fig. 2, the engine or motor is of the V-type in that the cylinders are arranged in banks, the series of cylinders constituting the one bank being inclined at an angle of approximately sixty degrees to the cylinders constituting the other bank. Such an arrangement is conducive to the symmetrical distribution of weight as pointed out above.

A perimetrical flange 8 is formed at the base of the upper crank-case-section 2 for abutting engagement with a corresponding flange 9 formed at the top of the lower crank-case-section 3. Bolts 10 penetrating both flanges maintain the respective crank-case-sections against separation. The upper crank-case-section, as illustrated to advantage in Fig. 4, is transversely partitioned as indicated at 11 to not only brace the crank case from end to end but to provide bearings for the crank shaft, designated as an entirety by the numeral 12, and the cam shaft designated as an entirety by the numeral 13, each shaft, as hereinafter pointed out, extending longitudinally of the crank case and in parallelism, with the cam shaft uppermost. Each partition 11 is of I-form in cross section in so far as practicable to secure a maximum of strength and lightness. The several partitions (preferably seven in number) are uniformly spaced and consequently provide a plurality of crank case compartments, each of which is designated 14. Radial ribs 15 formed upon the opposite faces of each partition reinforce and brace said partitions throughout. The particular location or arrangement of the reinforcing ribs is best illustrated in Fig. 2.

Supports for the engine pass transversely through the crank case and project laterally beyond the opposite longitudinal sides of the crank case 1. In the embodiment shown, seven supports are utilized, each support being denoted 16 and mounted to engage in a tubular socket 17 therefor formed in the partition 11 with which it (the support) is associated. To secure a maximum of rigidity, the supports 16 pass longitudinally through the partitions 11 and accordingly reinforce and brace the bearings for the crank shaft 12 and the cam shaft 13 and to a certain extent the crank case in its entirety. Lock nuts 18, mounted on each support 16, engage with the opposite outside longitudinal faces of the crank case 1 to preclude axial displacement of the said supports with respect to the engine. In Fig. 2 I have illustrated the manner in which the projected terminals of the several supports engage with the engine bed of an aircraft.

Since the motor is designed primarily for aeronautical use, the rear terminal of the crank case 1 is extended concentrically with respect to the crank shaft 12 as indicated at 19 in a substantially streamline manner to inclose at its extended terminal a thrust bearing 20 of a construction designed to receive both the radial and axial thrust created by the rapid rotation of the aircraft propeller herein illustrated and designated 21. The said extended terminal of the crank case is enlarged at its outer end as indicated at 22 and interiorly flanged adjacent said outer end as indicated at 23, the former embracing the thrust sleeve 24 of the bearing and the latter, with an end plate 25, precluding axial displacement of the sleeve. As illustrated in Fig. 26, the outside surface of the sleeve is substantially complemental to the inside surface of the enlarged terminal 22 of the extension 19.

While the particular type of thrust bearing utilized constitutes in no way a part of the present invention, it is thought best that a detail description be given since certain novel features are in evidence in consequence of the particular construction, combination and arrangement of the thrust bearing parts. The inner end of the sleeve 24 is interiorly threaded as indicated at 26 to receive an exteriorly threaded securing ring 27 of a construction in cross section affording a shoulder or abutment surface whereby the forward axial thrust of the shaft 12 is compensated for. Any suitable means such as that indicated at 28 may be utilized to secure the ring 27 against movement subsequent to adjustment with respect to the sleeve 24. Intermediate the ends of the sleeve 24, an annular internal flange 29 is formed, this flange serving as an abutment surface to receive the axial thrust when the propeller 21 is of the tractor type. Intermediate the shoulders formed by the ring 27 and the annular flange 29, three bearing rings are disposed, the inner ring being designated 30, the intermediate ring 31 and the outer ring 32. Ball bearings 34 are interposed between the ring 30 and the ring 31, and the ring 31 and the ring 32, the inner ball bearings compensating for the thrust of a pusher propeller, the outer ball bearings compensating for the thrust of a tractor propeller. An annular integral flange 35 is formed on the shaft 12 to engage with the intermediate bearing ring 31 that the axial thrust of the shaft may be directed onto the bearings interposed between the bearing ring 31 and the bearing ring 32. To transmit the thrust in the opposite direction and to the bearings interposed between the bearing ring 30 and the bearing ring 31, a collar 36 is provided, the mentioned collar embracing the shaft and abutting at one end the intermediate bearing ring 31 and at its opposite end the inner bearing ring 37 of the radial thrust bearing. To compensate for the radial thrust, ball bearings 38 are interposed between the inner ring 37 and an outer ring 39 concentric to said inner ring and somewhat larger. An interiorly threaded collar 40 mounted to engage with the exteriorly threaded portion 41 of the shaft 12 is utilized to preclude axial displacement of the bearing ring 37. A means may be provided such as that indicated at 42 to lock the collar 40 against movement with respect to the shaft 12. The specific propeller mounting designated as an entirety by the numeral 43 will not be herein set forth since the structure involved constitutes the subject matter of an application for patent now pending. (Improvements in propeller mountings filed Sept. 18, 1915, S. N. 51,482.)

To obtain the maximum of strength, each cylinder 5 is cast as an integral structure with an enlarged head portion 44 to offer an increased area whereby the intake opening 45 and exhaust opening 46 in the cylinder head may be relatively enlarged since it is essential in any aeronautical motor that the maximum of fuel supply be admitted to each cylinder. Flanges 52 are formed integrally with the cylinder interiorly of the jacket 51 to break the water flow and more effectually cool the cylinder as a result. The water induction pipe to the water jacket is designated 53 and the water outlet pipe 54, the former having connection with the water jacket adjacent the lower end thereof and at one side of the cylinder and the latter having connection with the said jacket at a substantially diametrically opposite point and adjacent the top thereof. The water jacket 51 is brazed at one end to a flange 55 integral with the cylinder (thus forming the bottom of the jacket) and at its opposite end to the periphery of the crown plate 49.

A more detailed description of the cam shaft 13 brings to light the fact that the several cam devices 117 are located at opposite sides of a point equidistant from its end not only symmetrically but in such relation to the various valve operating mechanisms as to provide for a reversal of the operation of the engine by simply removing, reversing and replacing the shaft. As before pointed out, the cam shaft is mounted to extend longitudinally of the crank case of the engine and transversely of the several partitions 11 formed therein. To secure the cam shaft against axial displacement with respect to the crank case and the several partitions during operation of the engine, flanges 125 are formed on said shaft to engage with and at opposite ends of what I shall hereinafter term the cam shaft center bearing. Each of the several cam shaft bearings is alike in its construction and designated 126. The several bearings engage, one with each crank case partition 11 as illustrated to advantage in Fig. 1. Studs 127 function to secure each of the several bearings against movement with respect to the crank case and consequently with respect to the cam shaft itself. Both terminals of the shaft are constructed alike to permit proper assembly of certain correlated parts without regard to the disposition of said shaft. A detailed description of the construction of the cam shaft terminals will be more particularly set forth hereinafter. To reverse the position of the cam shaft, it is but necessary that the several studs 127 be withdrawn from engagement with the bearings 126 and the cam shaft with the bearings thereon axially removed from a position within to a position without the crank case, reversed and thereafter replaced. As stated, a reversal of the operation of the engine will result.

Motion is transmitted to the cam shaft 13, from the crank shaft 12 of the engine through a train of intermeshing gears located at the front end of and within the crank case 1. A gear 128 is mounted at the forward end of the crank shaft as illustrated to advantage in Fig. 27, to mesh with a comparatively small gear 129 located intermediate the said gear 128 and a comparatively large gear 130 mounted at the forward end of the cam shaft 13. Both the crank shaft 12 and the cam shaft 13 are hollow throughout to secure lightness and at the same time provide for the proper circulation of lubricant therethrough as hereinafter more specifically disclosed. The forward end of the hollow crank shaft 12 is closed by the gear 128. An extension 129 is formed as an integral part of the gear 128 to snugly engage in the hollow shaft 12 in a manner permitting of securement by means of a key 130' located intermediate the said extension and the inner wall of the shaft to in turn engage in complemental grooves formed in each. The gear 128 is thus held against turning movement with respect to the shaft.

Gear 129 hereinbefore referred to is mounted at the inner end of a hollow magneto drive shaft 131, the said shaft engaging at its inner end in a radial thrust bearing 132 in turn engaging in a recess 133 formed in the forward or inner end crank case partition 11. The opposite end of the magneto drive shaft is mounted to engage in a similar bearing 134 mounted in a recess 135 formed interiorly of a cover plate 136 hereinafter referred to as a constituent element of the crank case cover 137. Bolts 138 are utilized to secure the cover plate 136 to the crank case cover. The mentioned cover 137, as illustrated to advantage in Fig. 4 is interiorly recessed or enlarged as indicated at 139 to inclose a reversible bevel magneto drive gear 140 and opposed bevel gears 141. Gear 140 is mounted to rotate with the shaft 131 to oppositely rotate the opposed gears 141. The gears 141 are mounted on opposed axially alined magneto shafts 142, each of which directly drives a magneto (of which there are two) located at opposite sides of the longitudinal axis of the engine and symmetrically as regards the shaft 113, both wholly exteriorly of the crank case. The magnetos may be of any accepted or well known type.

As a support for the opposed magnetos 143, a shelf 144 is formed integrally with the crank case, to which it is braced by ribbing 145. Such an arrangement will provide for separate removal of either magneto or removal of the magnetos as a unit by removing in its entirety the crank case cover 137 and the several sub-mechanisms or engine accessories mounted thereon.

To provide for a reversal of the operation of the magnetos should the operation of the engine be reversed, the gear 140 is made removable and reversible with respect to the shaft 131. The gear 140 when reversed will engage with the gears 141 at a point diametrically opposite to that illustrated in Figs. 3 and 4.

The gear 130 not only rotates the cam shaft 13 but indirectly the tachometer drive shaft 146 hereinafter referred to as forming a part of the tachometer designated as an entirety by the numeral 147. A crank arm 148 is mounted at the inner end of the tachometer drive shaft 146 to positively engage with the gear 140 and thus accordingly rotate the aforementioned shaft. To remove and assemble the tachometer, it is but necessary that a cover plate 149 forming a part thereof be removed. To secure the desired equal distribution of weight, the tachometer 147 is located in the vertical plane of the center axis of the engine, without the crank case and intermediate the opposed magnetos 123.

A breather pipe 150 screened as at 151 is mounted at the upper end of the crank case cover to communicate the interior of the crank case with the outside atmosphere for an obvious purpose.

The crank case cover 137 is further equipped with a water circulating pump, designated generally 152. Any type of pump may be used in the actual practice of the invention but it is preferred that a centrifugal double acting pump such as that described in a copending case be installed. (Water pump filed Sept. 27, 1916, S. N. 122,439.) The pump 152 is removably secured as at 153 to the end crank case cover for movement with the cover as a part thereof if desired. Motion is transmitted to the pump mechanism through the medium of a gear 154 in mesh with the gear 128 at a point preferably diametrically opposite to that engaged by the gear 129 since it is preferred that the train of gears at the forward end of the crank case be continuous in so far as practicable.

Coming now to a description of the force feed lubricating system, 155 designates an oil sump located at the base of the crank case by depressing or casting the lower crank case section 3 after the fashion illustrated to advantage in Fig. 1. A drip pan 156 is located intermediate the reservoir 155 and the various engine parts to catch and temporarily retain the oil draining from such parts. At each end of the reservoir, the lower crank case section 3 is shaped to define a housing 157 having an open top and bottom whereby a bodily removable strainer 158 may be interpolated in the connection between that portion of the lubricating system collecting the draining lubricant and the pump hereinafter more particularly described. The removable strainers 158 each comprise a substantially cylindrical open-sided body portion 159, a base plate 160, and flanges 161, the latter engaging interiorly of the housing 157 to centralize the strainer with respect thereto and the latter engaging with the underneath outside surface of said housing to provide for securement of the strainer as indicated at 162.

A plural pump structure designated generally 163 is located interiorly of the reservoir intermediate the fore and aft terminals thereof to feed, under pressure, the lubricant to the various engine parts and to return to the reservoir such lubricant as may have drained from such parts. Motion is transmitted to the pump mechanism from the crank shaft 12 via the gears 128 and 154 and a third gear 164 mounted interiorly of the crank case cover 128 at the extreme lower end thereof to constitute with the afore-mentioned gears the train of gears above referred to. The manner in which the gear 164 operates to drive the pump mechanism is apparent in reference to Fig. 1 wherefore a detail description of the said mechanism is thought unnecessary. As set forth in the pending application wherein the detail construction of the duplex pump is outlined, (improvements in lubricating system, filed Sept. 18, 1915, S. N. 51,481,) the pump may be bodily removed from its operative position within the reservoir through an opening 165 formed in the base of the sump. Opposed conduits 166 lead from the housings 158 at the opposite terminals of the sump to the oil pump 163 located in the reservoir. The oil indrawn through the conduits 166 is conveyed first to a receiving chamber (not shown) forming a part of the oil pump and thereafter to the reservoir without the screen surrounding the pump. As required for lubricating purposes, the oil is drawn through the screen or strainer from the reservoir and thereafter forced by operation of the pump through a conduit 167 to a distributing pipe 168 via a connecting pipe 169 and to the hollow cam shaft via a pipe 170. Branch feed pipes 171, one for each partition, lead from the distributing pipe 168 to discharge the lubricant forced therethrough directly to each of the several bearings of the crank shaft. From the bearings of the crank shaft, the oil is forced into and through the crank shaft and via ducts 172 along the several connecting rods 173 to containers 174 formed interiorly of the piston pin 175 of each piston 176.

The bearings for the crank shaft 12 are made sectional to provide for a removal of the crank shaft should occasion demand. The upper portion of each crank shaft bearing constitutes an integral part of the partition 11 while the lower part 182 is separable and secured to the upper part by bolts 183. If necessary, each partition 11 may be cut away as indicated at 184′ to provide for removal of the several bolts 183 when it is desired that the crank shaft be displaced.

Upon reference to Fig. 1 of the drawings, it will be observed that the connecting rods 173 engage with the crank shaft in pairs, one connecting rod of each pair being bifurcated as indicated at 184 to straddle the connecting rod with which it is directly associated. A bearing sleeve 185, flanged as indicated at 186, serves to maintain the connecting rods against relative movement. The sleeves 185 engage with the connecting rods in pairs.

The incessant and violent vibration of an aeronautical motor will in time cause the rocker-arm-supports to partially work loose, and if unattended to, allow the rocker-arms to assume positions out of operative relation with the valves intended for positive association therewith. To obviate this contingency and positively preclude relative movement of the parallel rocker-arm-supports, I connect, at the outer end, the said supports as indicated at 187. Said connection 187 is designed to penetrate the respective rocker-arms at their point of oscillation and accordingly maintain said arms at all times parallel and against relative sidewise movement. This arrangement is thought to be essentially novel.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In an internal combustion engine, a crank case comprising a transverse reinforcing integrally formed partition, said crank case partition having a transverse opening passing therethrough for the reception of a motor support and an elongated motor support passing through and engaging the walls of said opening and extending laterally beyond the sides of the crank case for engagement with the engine bed.

2. In an internal combustion engine, a crank case comprising two or more longitudinally spaced transverse partitions, said transverse partitions having transverse openings passing therethrough and adapted to receive therewithin motor supports and supports passing through and engaging the walls of said openings and extending laterally beyond the crank case for engagement with the engine bed.

3. In an internal combustion engine, a crank case construction comprising two or more transverse integrally formed reinforcing partition webs, said webs being displaced from each other along the longitudinal axis of the motor and having transverse openings therethrough, said openings terminating on the exterior of the sides of the crank case, and motor supports passing through and engaging the walls of said opening and extending laterally beyond the sides of the crank case for the purpose set forth.

4. In an internal combustion engine, a crank case construction embodying two or more transverse reinforcing integrally formed partition webs, said partition webs carrying in the lower part thereof bearing supports for the crank shaft and having openings passing therethrough and located immediately above said bearing supports and motor supports passing transversely through said crank case by way of said openings and extending laterally beyond the sides of the crank case whereby the weight of the motor and the strains due to operation of the motor are transmitted directly to said reinforcing members.

5. In an internal combustion engine, a crank case construction embodying a lower half and an upper half, said upper half comprising a plurality of transverse reinforcing integrally formed partition webs, said partition webs having crank shaft bearing supports on the lower parts thereof, said partition webs also having openings passing all the way therethrough and transversely of the crank case, said openings being disposed immediately above the crank shaft bearing supports and a plurality of motor supports engaging the walls of said openings, and passing all the way therethrough for the purpose set forth.

6. In an internal combustion engine, a crank case construction embodying a lower half and an upper half, said upper half comprising a plurality of transverse reinforcing integrally formed partition webs, said partition webs having crank shaft bearing supports on the lower parts thereof and cam shaft bearing supports adjacent the upper parts thereof, said partition webs also having openings passing all the way therethrough and transversely of the crank case, said openings being disposed between said crank shaft and said cam shaft bearing supports, and a plurality of motor supports engaging the walls of said openings and passing all the way therethrough for the purpose set forth.

7. In an internal combustion engine, a crank case comprising transverse reinforcing partitions integrally formed within said crank case, each of said partitions carrying a bearing for said crank shaft and a plurality of engine supporting devices passing transversely through said crank case, each of said supporting devices directly engaging with one of said partitions and extending beyond the sides of the crank case for the purpose set forth.

8. In an internal combustion engine, a motor frame work comprising an open ended crank case, said crank case comprising an upper half and a lower half and an end closing plate therefor, said upper half having a plurality of transverse reinforcing partition webs integrally formed therein, said partitions carrying supports for the bearings of the crank shaft, said partitions having transverse openings therethrough which are located immediately above said bearing supports and terminate on the exterior of the sides of the crank case, and a plurality of motor supports passing through said transverse partitions for the purpose set forth.

9. In an internal combustion engine, the motor framework comprising an open ended crank case, said crank case comprising an upper half and a lower half and an end closing plate therefor, said upper half having a plurality of transverse reinforcing partition webs integrally formed therein, said partitions carrying supports for the bearings of the crank shaft on the lower part thereof and cam shaft bearing supports on the upper parts thereof, said partitions also having transverse openings therethrough which are located between the cam shaft bearing supports and the crank shaft bearing supports and terminate on the exterior of the sides of the crank case and a plurality of motor supports passing through said transverse partitions for the purpose set forth.

10. In an internal combustion engine, a crank case comprising transverse partitions integrally formed in said crank case, a crank shaft, a bearing supported in each partition for said shaft, and a plurality of engine supporting devices mounted to directly engage with each of the said partitions and extend beyond the sides of said crank case.

11. In an internal combustion engine, in combination, a crank case, a plurality of transverse reinforcing members fixed to the interior of said crank case, said crank case and said transverse members having transverse registering openings, and a plurality of engine supports passing through and extending beyond said openings.

12. In an internal combustion engine, in combination, a crank case, a crank shaft, a plurality of bearing supports for said shaft located within said crank case and formed integrally therewith, the bearing structures and the crank case having registering transverse openings, and a plurality of engine supports passing through and extending beyond said openings.

13. In an internal combustion engine, an open ended crank case, a crank shaft, bearings for said shaft, independent engine accessories adapted to be mounted at one end of the crank case, a driving means for the several accessories operatively associated with the crank shaft, and a cover for the driving mechanism removable as a unit and dually functioning as a support for the accessories and as a closure for the open end of the crank case.

14. In an internal combustion engine, a crank case open at one end, a crank shaft, independent engine accessories adapted to be mounted adjacent said open end of the crank case, a train of intermeshing gears operatively associated with the crank shaft and with the several accessories for transmitting motion from one to the other thereof, and a one piece removable cover for the several gears dually functioning as a support for the accessories and as a closure for the open end of the crank case.

15. In an internal combustion engine, a crank shaft, a crank case transversely partitioned to provide bearing supports for said shaft, a magneto, a tachometer, and a pump adapted to mounted at one end of the crank case, driving mechanism for the magneto, the tachometer and the pump, located at one end of the crank shaft, and a support for the magneto, the tachometer and the pump, said support dually functioning as a cover for the driving mechanism and as a closure for the crank case.

16. In an internal combustion engine, a frame structure comprising a crank case open at one end, a one piece bodily removable cover structure closing the open end of the crank case, a magneto driving gear support, and a support for the magneto forming an integral part of the cover.

17. In an internal combustion engine, a crank case open at one end, a crank shaft, a bodily removable cover structure closing the open end of the crank case, a magneto, a pump and a tachometer removable with the cover structure, and a driving connection between the crank shaft and the magneto, the tachometer and the pump.

18. In an internal combustion engine, a frame structure comprising a crank case open at one end, a removable cover closing said open end, a shelf forming an integral part of the cover, a driving shaft mounted on supports integral with said crank case, an engine accessory serving as a driving member mounted on the shelf in alinement with said shaft, and a driving connection between said driving member and the driving shaft adapted to be broken by removal of the cover.

In testimony whereof I affix my signature.

CHARLES B. KIRKHAM.